United States Patent
Trossen (10) Patent No.: US 7,634,564 B2
(45) Date of Patent: Dec. 15, 2009

(54) SYSTEMS AND METHODS FOR INVOKING A SERVICE FROM A PLURALITY OF EVENT SERVERS IN A NETWORK

(75) Inventor: Dirk Trossen, Cambridge, MA (US)

(73) Assignee: Nokia Corporation, Espoo (FI)

( * ) Notice: Subject to any disclaimer, the term of this patent is extended or adjusted under 35 U.S.C. 154(b) by 1132 days.

(21) Appl. No.: 10/991,802

(22) Filed: Nov. 18, 2004

(65) Prior Publication Data

US 2006/0168319 A1    Jul. 27, 2006

(51) Int. Cl.
G06F 15/16 (2006.01)
G06F 15/173 (2006.01)
G06F 15/177 (2006.01)

(52) U.S. Cl. .................... 709/225; 709/203; 719/318

(58) Field of Classification Search .................. 719/318; 709/203, 217–228
See application file for complete search history.

(56) References Cited

U.S. PATENT DOCUMENTS

| | | | | |
|---|---|---|---|---|
| 2003/0095540 A1* | 5/2003 | Mulligan et al. | ............ | 370/352 |
| 2004/0003058 A1 | 1/2004 | Trossen | | |
| 2004/0128344 A1 | 7/2004 | Trossen | | |
| 2004/0153552 A1* | 8/2004 | Trossen et al. | .............. | 709/229 |
| 2004/0260819 A1* | 12/2004 | Trossen | ...................... | 709/229 |
| 2005/0021976 A1* | 1/2005 | Trossen | ...................... | 713/182 |
| 2005/0176404 A1* | 8/2005 | Hundscheidt et al. | ........ | 455/406 |

OTHER PUBLICATIONS

Knarig Arabshian, Henning Schulzrinne; *GloServ: Global Service Discovery Architecture*; Jun. 2004; 16 pages.
A.B. Roach; *Session Initiation Protocol (SIP)—Specific Event Notification*; Jun. 2002; 38 pages; Network Working Group; The Internet Society (2002).

\* cited by examiner

*Primary Examiner*—Haresh N Patel
(74) *Attorney, Agent, or Firm*—Ditthavong Mori & Steiner, P.C.

(57) ABSTRACT

A system is provided for multipoint service (e.g., web service) invocation includes a plurality of event servers and a proxy. The event servers are associated with a group address representative of at least one characteristic of the event servers, and are also associated with at least one contact address. The proxy is capable of receiving a request for invocation of a service, where the request is addressed to the group address. In response to receiving the request, the proxy is capable of mapping the group address to at least one contact address associated with the event servers, and forwarding the service invocation request to the event servers based upon the at least one contact address. In turn, the event servers are capable of receiving the service invocation request and separately invoking the requested service.

22 Claims, 3 Drawing Sheets

SYSTEMS AND METHODS FOR INVOKING A SERVICE FROM A PLURALITY OF EVENT SERVERS IN A NETWORK

FIELD OF THE INVENTION

The present invention relates generally to telecommunications networks and, more particularly, relates to systems and methods for multipoint service invocation in networks.

BACKGROUND OF THE INVENTION

Event subscription and notification in network environments is becoming increasingly commonplace and important. Event subscription generally allows a first network entity to subscribe to event notifications from a second entity. Common examples of events include "presence" and "location;" however, the number and types of events are endless. For instance, conventional instant messaging services permit a first user to subscribe to a presence event for a second user. As such, during the period of the subscription, the first user receives updates as to the presence status (e.g., online or offline) of the second user. The subscription may be for a single inquiry, which will return a response of "present" or "not present" for the second user. The subscription may also be for a set period of time, which may result in multiple updates, or for other options (e.g., status change notifications, ongoing notifications, etc.)

Various protocols may be used for event subscription and notification. For example, the Session Initiation Protocol (SIP) may be used for such purposes (see, e.g., IETF request for comment document RFC 3261, entitled: SIP: Session Initiation Protocol, July 2002, the contents of which are hereby incorporated by reference in its entirety). SIP was generally developed to allow for initiating a session between two or more endpoints in the Internet by making these endpoints aware of the session semantics. Accordingly, devices (or users that run certain applications on these devices) are registered with the SIP backbone so that an invitation to a particular session can be correctly delivered to these endpoints. To achieve this, SIP provides a registration mechanism for devices and users, and it applies mechanisms such as location servers and registrars to route the session invitations appropriately. Although SIP is primarily a tool for initiating a communication session between endpoints, extensions to SIP have been proposed to provide event registration and trigger notification (see e.g., IETF document RFC 3265, SIP-Specific Event Notification, July 2002, the contents of which are hereby incorporated by reference in its entirety).

The SIP event framework, which would enable event-based information provisioning to any node in the Internet, is supposed to become a key element within the SIP infrastructure. Apart from providing information regarding certain events, such as presence or location, the SIP event framework provides the means for an event-based service invocation system. In this regard, there are numerous techniques in place for performing remote procedure invocation in distributed systems, such as RPC's (Remote Procedure Calls), CORBA (Common Object Request Broker Architecture) and Jini™. These techniques, however, typically aim at distributed software problems and remote procedure calls on a much lower software level. And in contrast to procedure invocation, service invocation typically occurs on a much higher level of abstraction. Also, conventional techniques such as RPC's, COBRA and Jini™ typically require a complex infrastructure present on the device performing the service invocation.

Consider, for example, a service provider offering an online auction service, and a user desiring to access this service to sell a car. Conventionally, a service invocation by the user starts an auction with the service provider for the car, and the service is seen as terminated after the car is sold. But even more, the service provider can provide information to the user about the progress of the service. For example, the service provider may provide the user with information relating to any bids that the service provider has received for the car, the amount of the bids, and so forth. In this regard, service parameters for the service invocation may relate, for example, to price and other information regarding the car and the command to start the auction for the car.

Another example relating to service information relates to remote recording of a video stream. Consider, then, that a mobile user desires to remotely start a service with a home entertainment system to record a certain television program at a certain time in the future. In such an instance, the home entertainment system may provide the service to the user, and once the service is started, notify the user regarding its progress (e.g., "recording not yet started" or "recording") and/or its ending. As can be seen, then, targeted service invocations typically aim at a much higher level than procedural invocation such as in RPC's.

SUMMARY OF THE INVENTION

In light of the foregoing background, embodiments of the present invention provide an improved system and method for multipoint service invocation. In this regard, the system and method of embodiments of the present invention are capable of providing service invocation without requiring techniques such as RPC's, COBRA, Jini™ or the like. And assuming the existence of SIP and SIP event implementations on the service invoking devices, the system and method of embodiments of the present invention are also capable of utilizing SIP to invoke services and receive information regarding the progress of such services.

Consider that, in addition to the above point-to-point service invocation examples, at various instances it may be desirable to simultaneously invoke services at a plurality of service providers, which may result in a set of responses, one from each service provider. The system and method of embodiments of the present invention therefore also permit point-to-multipoint service invocation. For example, consider peer-to-peer (P2P) file sharing in which a service is advertised to permit access to public files at each peer in the network. Instead of individually invoking this service at each peer, the system and method of embodiments of the present invention permit a device to invoke the service once at the client's side. The service invocation can then be delivered to each peer that previously registered the respective service, with the results from the service providers of the network thereafter being individually delivered to the client. In these responses, the individual peers are uniquely identified. And although such multipoint service invocation may be advantageous for wireline networking applications, it is more particularly advantageous for wireless networking applications due to the potential bandwidth saving effect of the multipoint invocation.

According to one aspect of the present invention, a system is provided for multipoint service invocation. The system includes a plurality of event servers and a proxy. The event servers are associated with a group address representative of at least one characteristic of the event servers, such as at least one service provided by the event servers and/or a location of the event servers. In addition to the group address, the event servers are associated with at least one contact address. The proxy is capable of receiving an event subscription request for invocation of a service, where the request is addressed to the group address. In response to receiving the request, the proxy is capable of mapping the group address to at least one contact address associated with the event servers, and forwarding the service invocation request to the event servers based upon the at least one contact address. In turn, the event servers are capable of receiving the service invocation request and separately invoking the requested service, such as in a substantially parallel manner.

The system can further include an invoking entity. In such instances, the proxy can be capable of receiving the service invocation request from the invoking entity. Also, at least one of the event servers can be further capable of sending at least one notification to the invoking entity to thereby notify the invoking entity of the progress of the service invocation.

More particularly, for example, the event servers can be associated with a group address representative of a web service provided by the event servers. In such an instance, the proxy can be capable of receiving a request encapsulated in accordance with a given protocol, such as in a SOAP (Simple Object Access Protocol) envelope.

A method, proxy and invoking entity are also provided. Embodiments of the present invention therefore provide an improved system, method, proxy and invoking entity for multipoint service invocation. Advantageously, embodiments of the present invention are capable of invoking a service at a plurality of event servers utilizing a group address that can be mapped to contact addresses more uniquely identifying the respective event servers. The invoking entity can therefore invoke a service at a plurality of event servers based upon the group address, without separately addressing each of the event servers, the event servers being separately addressed by the proxy that maps the group address to the contact addresses of the event servers. As such, the system and method of embodiments of the present invention solve the problems identified by prior techniques and provide additional advantages.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
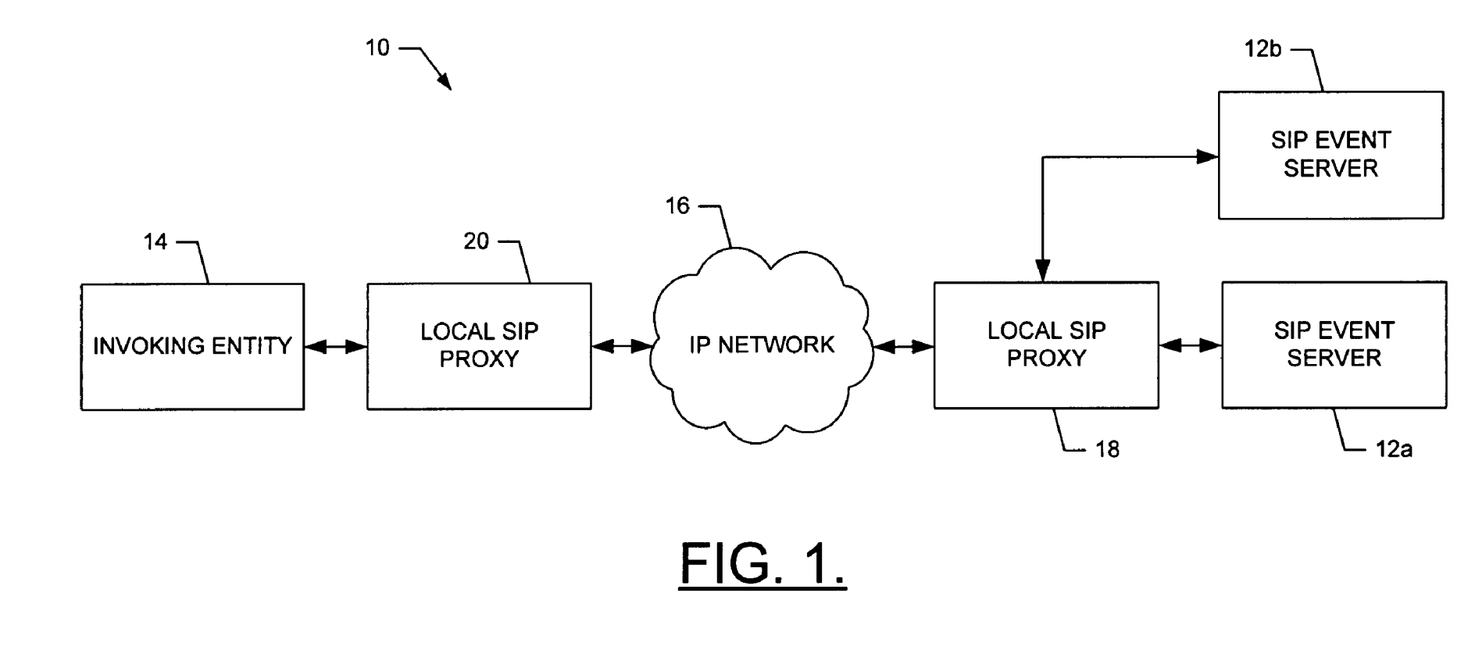
FIG. 1 shows a system that supports multipoint service invocation according to one embodiment of the present invention.

Referring now to FIG. 1, a general system 10 is shown that supports multipoint service invocation in one or more networks, in accordance with embodiments of the present invention. The system generally includes one or more SIP (Session Initiation Protocol) event servers 12 (two being shown as 12a and 12b), an invoking entity 14, and an IP communications network 16 through which the SIP event server(s) and the invoking entity communicate. Also in accordance with embodiments of the present invention, the system may provide a SIP framework. As such, the SIP event servers and the invoking entity are each registered with a corresponding local SIP proxy 18 and 20, respectively. As shown, a plurality of event servers is registered with the same SIP proxy. It should be understood, however, that one or more SIP proxies may alternatively register a single event server, without departing from the spirit and scope of the present invention. Based on the illustrated system, then, methods of invoking a service according to embodiments of the present invention may be practiced, as explained below.

The SIP event server(s) 12 may include, or otherwise be in communication with, a network entity such as a mobile station or other device having service and/or content capabilities, such as being able to support multimedia sessions of various parameters. The invoking entity 14 may be any network entity that invokes a service at one or more SIP event servers. In this regard, the SIP event servers may be in communication with one or more local repositories (not shown), each of which maintains a database of service and/or content subscriptions. Now referring to FIG. 2, a block diagram of an entity capable of operating as a SIP event server 12, invoking entity 14 and/or SIP proxy 18, 20, is shown in accordance with one embodiment of the present invention. Although shown as separate entities, in some embodiments, one or more entities may support one or more of a SIP event server, invoking entity and/or SIP proxy, logically separated but co-located within the entit(ies). For example, a single entity may support a logically separate, but co-located, SIP event server and SIP proxy, or invoking entity and SIP proxy.

Figure 2:
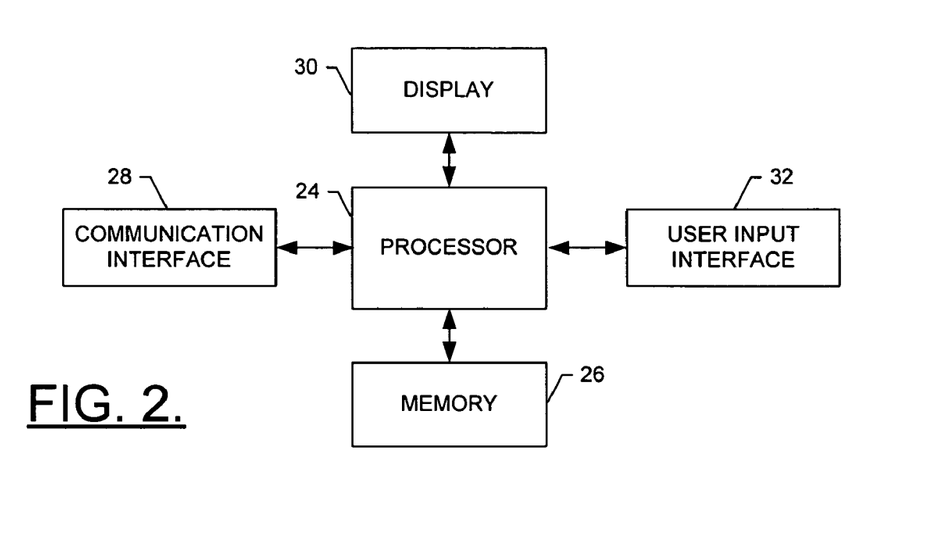
FIG. 2 is a schematic block diagram of an entity capable of operating as a SIP event server, invoking entity and/or SIP proxy, in accordance with one embodiment of the present invention.

As shown, the entity capable of operating as a SIP event server 12, invoking entity 14 and/or SIP proxy 18, 20 generally includes a processor 24 connected to a memory 26. The memory can comprise volatile and/or non-volatile memory, and typically stores content, data or the like. For example, the memory typically stores content transmitted from, and/or received by, the entity. Also for example, the memory typically stores applications, instructions or the like for the processor to perform steps associated with operation of the entity in accordance with embodiments of the present invention. In addition to the memory, the processor can also be connected to at least one interface or other means for displaying, transmitting and/or receiving data, content or the like. In this regard, the interface(s) can include at least one communication interface 28 or other means for transmitting and/or receiving data, content or the like, as well as at least one user interface that can include, for example, a display 30 and/or a user input interface 32. The user input interface, in turn, can comprise any of a number of devices allowing the entity to receive data from a user, such as a keypad, a touch display, a joystick or other input device.

Figure 3:
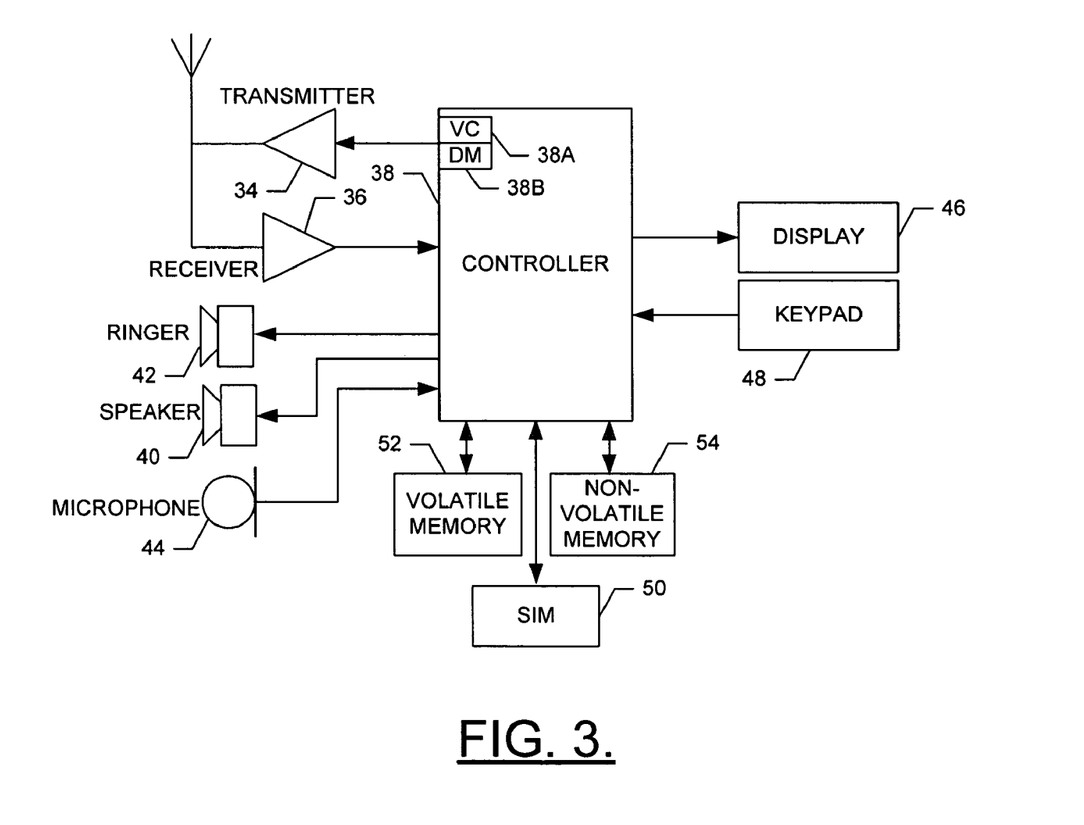
FIG. 3 is a functional diagram of a mobile station that may operate as a SIP event server and/or invoking entity according to embodiments of the invention.

Reference is now made to FIG. 3, which more particularly illustrates a functional diagram of a mobile station that may operate as a SIP event server 12 and/or invoking entity 14 according to embodiments of the invention. It should be understood, that the mobile station illustrated and hereinafter described is merely illustrative of one type of mobile station that would benefit from the present invention and, therefore, should not be taken to limit the scope of the present invention. While several embodiments of the mobile station are illustrated and will be hereinafter described for purposes of example, other types of mobile stations, such as portable digital assistants (PDAs), pagers, laptop computers and other types of voice and text communications systems, can readily employ the present invention.

The mobile station includes a transmitter 34, a receiver 36, and a controller 38 or other processor that provides signals to and receives signals from the transmitter and receiver, respectively. These signals include signaling information in accordance with the air interface standard of the applicable cellular system, and also user speech and/or user generated data. In this regard, the mobile station can be capable of operating with one or more air interface standards, communication protocols, modulation types, and access types. More particularly, the mobile station can be capable of operating in accordance with any of a number of first-generation (1G), second-generation (2G), 2.5G and/or third-generation (3G) mobile communication protocols or the like. More particularly, one or more mobile stations may be coupled to one or more networks capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. In addition, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrow-band AMPS(NAMPS), as well as TACS, network(s) may also benefit from embodiments of the present invention, as should dual or higher mode mobile stations (e.g., digital/analog or TDMA/CDMA/analog phones).

It is understood that the controller 38 includes the circuitry required for implementing the audio and logic functions of the mobile station. For example, the controller may be comprised of a digital signal processor device, a microprocessor device, and various analog to digital converters, digital to analog converters, and/or other support circuits. The control and signal processing functions of the mobile station are allocated between these devices according to their respective capabilities. The controller thus also includes the functionality to convolutionally encode and interleave message and data prior to modulation and transmission. The controller can additionally include an internal voice coder (VC) 38A, and may include an internal data modem (DM) 38B. Further, the controller may include the functionally to operate one or more software programs, which may be stored in memory. For example, the controller may be capable of operating a connectivity program, such as a conventional Web browser. The connectivity program may then allow the mobile station to transmit and receive Web content, such as according to the Wireless Application Protocol (WAP), for example.

The mobile station also comprises a user interface including a conventional earphone or speaker 40, a ringer 42, a microphone 44, a display 46, and a user input interface, all of which are coupled to the controller 38. The user input interface, which allows the mobile station to receive data, can comprise any of a number of devices allowing the mobile station to receive data, such as a keypad 48, a touch display (not shown) or other input device. In embodiments including a keypad, the keypad includes the conventional numeric (0-9) and related keys (#, *), and other keys used for operating the mobile station.

The mobile station can also include memory, such as a subscriber identity module (SIM) 50, a removable user identity module (R-UIM) or the like, which typically stores information elements related to a mobile subscriber. In addition to the SIM, the mobile station can include other memory. In this regard, the mobile station can include volatile memory 52, such as volatile Random Access Memory (RAM) including a cache area for the temporary storage of data. The mobile station can also include other non-volatile memory 54, which can be embedded and/or may be removable. The non-volatile memory can additionally or alternatively comprise an EEPROM, flash memory or the like. The memories can store any of a number of pieces of information, and data, used by the mobile station to implement the functions of the mobile station. For example, the memories can store an identifier, such as an international mobile equipment identification (IMEI) code, international mobile subscriber identification (IMSI) code, mobile station integrated services digital network (MSISDN) code (mobile telephone number), Internet Protocol (IP) address or the like, capable of uniquely identifying the mobile station, such as to a mobile switching center (MSC). Also, for example, the memories can store instructions for creating messages related to embodiments of the present invention, as explained below.

Generally, in accordance with embodiments of the present invention, an invoking entity 14 is adapted to invoke a service at a plurality of event servers 12 registered with the system 10 to provide that service. The event servers can then individually provide the requested service to the invoking entity. As will be appreciated, such a technique for invoking services may be beneficial in a number of different contexts including, for example, peer-to-peer file sharing (P2P) and location-based service invocation. More particularly, for example, consider a service that is advertised as permitting access to public files at a number of peers in a P2P network. In accordance with embodiments of the present invention, instead of requesting a file individually at each peer, the invoking entity can invoke the file sharing service at a single instance. The service invocation (e.g., file request) can then be delivered to each peer in the P2P network that has registered to provide public files within the network. The results of the file request can then be individually delivered to the invoking entity, with the individual peers being uniquely identified, if so desired.

Also, consider a service invocation directed to event servers 12 at a particular location. Similar to the context of P2P file sharing, in accordance with embodiments of the present invention, the invoking entity 14 can invoke services at the particular location at a single instance, with the service invocation delivered to each event server that has registered as being positioned at the particular location. The event servers may then individually respond to the service invocation, the event servers being uniquely identified to the invoking entity.

As will be appreciated, the entities in the system 10 can be addressable or otherwise uniquely identifiable within the network, such as by means of a uniform resource identifier (URI). And as will also be appreciated from the preceding examples, the invoking entity 14 may be adapted to invoke services at a plurality of event servers 12 by individually identifying the URI's of the event servers in a single service invocation. Advantageously, to facilitate the invoking entity invoking services at a plurality of event servers without requiring the invoking entity to individually identify the event servers, however, the event servers may be grouped in one or more groups based upon one or more characteristics of the event servers. As such, instead of individually identifying the event servers at which the invoking entity invokes a service, the invoking entity may identify a group of event servers based upon the characteristic(s) from which the event servers are grouped.

More particularly, in accordance with embodiments of the present invention, one or more event servers 12 within one or more groups of event servers may be assigned one or more group addresses, such as one or more address-of-record (AOR) URI's, representative of one or more characteristics of the event server(s). In this regard, a cable set-top box (i.e., event server) located in the living room of a home may be assigned an AOR reflective of the service provided by the set-top box, as well as an AOR reflective of the location of the set-top box. For example, such a set-top box may be assigned the following AOR's:

"sip:service.cablebox@myhome.com"
"sip:location.livingroom@myhome.com"

where "myhome.com" identifies the network domain of the home within which the set-top box is located. Thus, an invoking entity 16 may invoke a service at the set-top box, as well as any other set-top boxes within the home, by invoking the service to the AOR "sip:service.cablebox@myhome.com." Similarly, the invoking entity may invoke a service at the set-top box, as well as any other event servers located in the living room, by invoking the service to the AOR "sip:location.livingroom@myhome.com."

To further specify sub-groups within a group of event servers 12, at least a portion of the AOR's assigned to the event servers may be hierarchically organized. For example, in addition to or in lieu of the preceding AOR's for a set-top box, the set-top box may be assigned the AOR "sip:service.cablebox.location.livingroom@myhome.com," or the AOR "sip:location.livingroom.service.cablebox@myhome.com." In this instance, within the group of set-top boxes in the home, set-top boxes within the living room may be addressed based upon the two individual AOR's above, or based upon the hierarchical AOR. For information on a similar AOR naming scheme, see K. Arabshian, H. Schulzrinne, *GloServ: Global Service Discovery Architecture*, FIRST ANNUAL INTERNATIONAL CONFERENCE ON MOBILE AND UBIQUITOUS SYSTEMS: NETWORKING AND SERVICES (MOBIQUITOUS '04) 319-325 (Aug. 22-26, 2004).

As indicated above, the SIP event server and the invoking entity are each registered with a corresponding local SIP proxy 18 and 20, respectively. By registering with the SIP proxies, the SIP proxies can thereafter properly direct communication to and/or from the event server and invoking entity, respectively. More particularly with respect to the AOR's assigned to the event server, then, the event server typically registers with the local SIP proxy to thereby bind one or more AOR's assigned to the event server with a contact address or URI of an entity from which the event server may be accessed. More particularly, registration of the event server includes the event server sending a SIP REGISTER message to the local SIP proxy 18 for registering its location in the system.

The payload of the REGISTER message can include a number of different pieces of information such as, for example, one or more AOR's assigned to the event server 12, such as those described above for example (e.g., "sip:service.cablebox@myhome.com," and "sip:location.livingroom@myhome.com"). In addition, the payload of the REGISTER message can include the contact URI of a network entity from which the event server may be accessed, where the network entity may itself comprise the event server such that contact URI is also assigned to the event server. Continuing the above example, then, the contact URI may be that of the set-top box itself, and may comprise: "sip:pc27@myhome.com." Upon reception of REGISTER message, the SIP proxy 18 registers the event server by binding the AOR's assigned to the event server with the contact URI. Thereafter, the SIP proxy can, but need not, return a registration confirmation message to the event server. For more information on such a technique for registering with a SIP proxy, see IETF RFC 3261.

Figure 4:
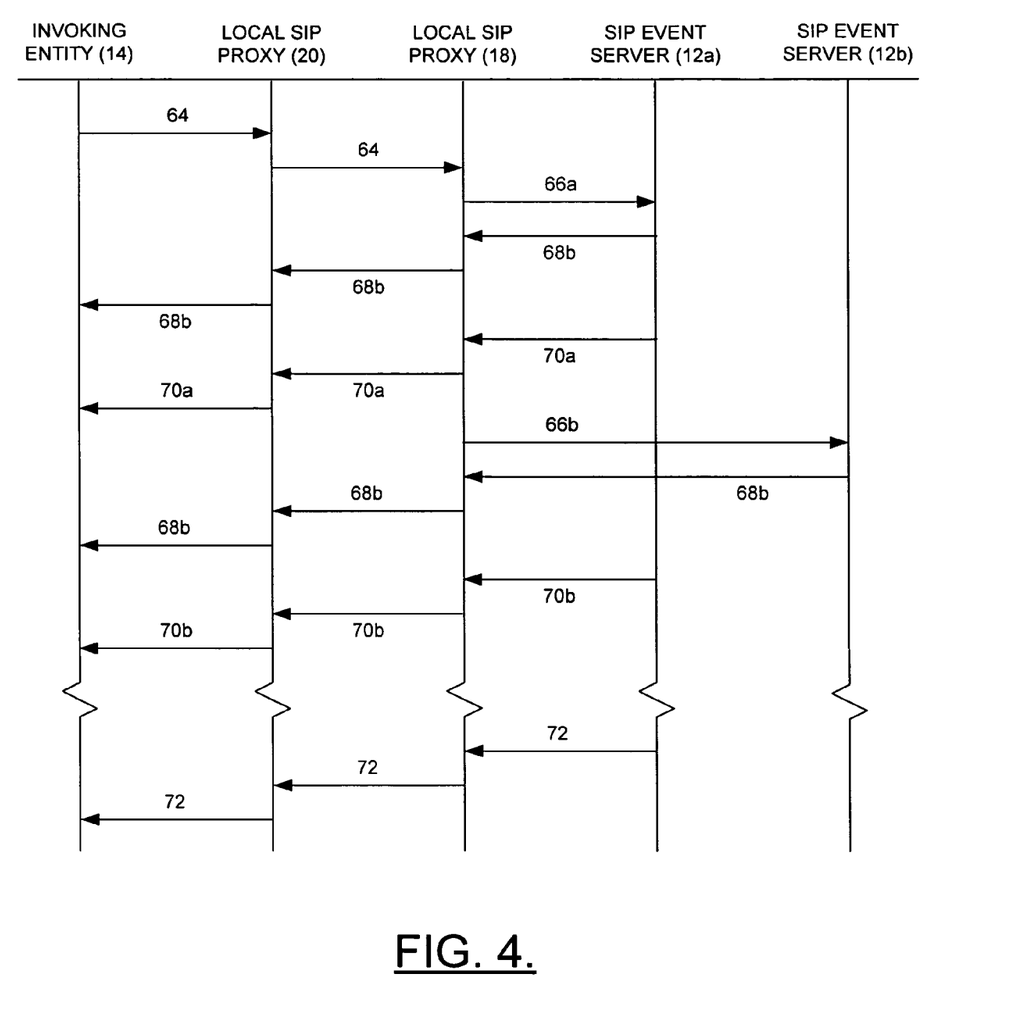
FIG. 4 shows message flows between entities in a method of multipoint service invocation according to one embodiment of the present invention.

Referring now to FIG. 4 in particular, as well as FIGS. 1-4 in general, message flows for a method of multipoint service invocation, according to one embodiment of the present invention, are shown. According to the method, SIP event servers 12a, 12b may register one or more AOR's with one or more local SIP proxies (one shown as SIP proxy 18). The invoking entity 14 may then invoke a desired service at multiple event servers by subscribing to an appropriate event package, the subscription being addressed to an AOR assigned to multiple event servers having characteristic(s) represented by the AOR. From the AOR, then, the SIP proxies can direct the subscription to the respective event servers, which can individually invoke the desired service in response to the subscription. In addition, the event servers can send the invoking entity one or more notifications related to the service invocation, such as the progress of the invoked service, in response to the subscription.

More particularly, to effectuate a multipoint service invocation, the invoking entity 14 sends a SUBSCRIBE message 64 to its corresponding local SIP proxy 20, where the SUBSCRIBE message requests a service invocation. In accordance with the multipoint service invocation method of embodiments of the present invention, the SUBSCRIBE message is addressed to an AOR assigned to multiple event servers 12a, 12b having characteristic(s) represented by the AOR. The SUBSCRIBE message may be identified by the name of the event package, as defined in, for example, IETF request for comment document IETF RFC 3265, entitled: *SIP-Specific Event Notification*, July 2002, the contents of which are hereby incorporated by reference in its entirety. For example, the SUBSCRIBE message may be identified through an event package named "service_invocation."

The SUBSCRIBE message typically contains as a payload the identity or description of the service (e.g., service name) the invoking entity 14 desires to invoke. In addition, the payload may include one or more parameters required to properly invoke the desired service. For example, the payload may include an "expires" parameter indicating a duration of the subscription. Additionally or alternatively, continuing the above P2P file sharing example, for instance, the payload may include a parameter identifying a desired file stored by one or more peers (i.e., event servers 12a, 12b). Further, the payload may include one or more other pieces of information such as, for example, a contact address or URI for notifications, and/or a desired rate for receiving notifications. The SUBSCRIBE message 64 according to this embodiment may be a message that is part of an extension to SIP as defined in IETF RFC 3265. The format of the semantic description in the payload may include, for example, attribute-based formats such as used in SLP (Service Location Protocol) or RDF (Resource Description Framework)-based formats or a dedicated format for SIP service description.

The SUBSCRIBE message 64 is appropriately forwarded to the local SIP proxy 18 of the event servers 12a, 12b. In response to the SUBSCRIBE message, the SIP proxy 18 maps the AOR in the SUBSCRIBE message to the contact addresses of one or more event servers. In this regard, as will be appreciated, each event server may register a contact address with the local SIP proxy 18, the contact address of the event server being bound to one or more AOR's assigned to the event server. And as an AOR may be representative of characteristic(s) of, and thus assigned to, more than one event server, one or more AOR's registered with the local SIP proxy may be bound or otherwise mapped to more than one contact address, and thus addressed to more than one event server. Upon mapping the AOR in the SUBSCRIBE message to the contact addresses of one or more event servers, the local SIP proxy 18 can fork or otherwise forward the SUBSCRIBE message 66 (shown as 66a and 66b for the different event servers) to each of the respective event servers.

After receiving the SUBSCRIBE message 66 from the local SIP proxy 18, each SIP event server 12a, 12b extracts the service invocation information (e.g., service description, parameter(s), other information, etc.) from the payload. At each SIP event server, after extracting or otherwise receiving the service invocation information, the SIP event server generates a SIP event subscription based upon the service invocation information. The SIP event server then stores the subscription for the service invocation, including the service invocation information, in memory 26 of the SIP event server.

Also after receiving the SUBSCRIBE message 66, each SIP event server 12a, 12b locally invokes the desired service (identified in the SUBSCRIBE message 66) based upon the service invocation information. Advantageously, the SIP event servers can be capable of locally invoking the desired service in a substantially parallel manner. After invoking the service, the SIP event server appropriately confirms receipt of the SUBSCRIBE message with message 68, such as a '200 OK' message, sent to the invoking entity via proxies 18 and 20. Alternatively, if the SIP event server fails to invoke the desired service, such as due to one or more incorrect parameters, lack of resources, lack of permission to invoke the service or the like, the SIP event server may send message 68 to the invoking entity via proxies 18 and 20, where the message indicates failure to invoke the desired service.

Further, each SIP event server 12a, 12b can send a NOTIFY message 70 back to the invoking entity 14 via proxies 18 and 20. This message includes the current progress of the invoked service which, just upon invoking the service, may indicate that the service has "started." Upon reception of the NOTIFY message, the invoking entity extracts the current progress of the invoked service, which the invoking entity may process for a number of different purposes. As will be appreciated, because the local SIP proxy 18 separately forwarded the SUBSCRIBE message 66 to each SIP event server, the invoking entity may receive multiple NOTIFY messages (shown as 70a and 70b), one from each of the SIP event servers (i.e., contact addresses mapped by the local SIP proxy 18 from the AOR included in the SUBSCRIBE message 64 from the invoking entity).

Depending on the length of the subscription and/or the nature of the invoked service, the invoking entity 14 may receive one or more notifications at one or more regular or irregular intervals from one or more of the SIP event servers 12a, 12b. More particularly, at one or more instances after generating the SIP event subscription, one or more of the SIP event servers may generate a NOTIFY message 72 (shown for SIP event server 12a) including the current progress of the invoked service. Additionally or alternatively, although not shown, the current progress of the invoked service may notify the invoking entity of a graceful termination or failure of the invoked service. As with the initial NOTIFY message 70, the subsequent NOTIFY message(s) 72 can be sent to the invoking entity via SIP proxies 18 and 20.

Although not shown, at any given instance before expiration of the subscribed service invocation, the invoking entity 14 may desire to terminate the service invocation at one or more of the respective SIP event servers 12a, 12b. In such instances, the invoking entity may remove a subscription to the service invocation in a manner similar to that in which the invoking entity subscribed to the service invocation. That is, the invoking entity 14 can send a SUBSCRIBE message (see SUBSCRIBE message 64) to its corresponding local SIP proxy 20, addressing the SUBSCRIBE message to the AOR for which the invoking entity desires to terminate the service invocation (i.e., the AOR assigned to event servers 12a, 12b). In contrast to the SUBSCRIBE message sent by the invoking entity to invoke the service, however, the SUBSCRIBE message to terminate the invoked service requests termination of a subscription.

Like the SUBSCRIBE message sent by the invoking entity 14 to invoke the service, the SUBSCRIBE message terminating the invoked service is appropriately forwarded to the local SIP proxy 18 of the event servers 12a, 12b, which maps the AOR in the SUBSCRIBE message to the contact addresses of one or more event servers, and forks or otherwise forwards the SUBSCRIBE message (see SUBSCRIBE message 66) to each of the respective event servers. Then, after receiving the SUBSCRIBE message from the local SIP proxy 18, each SIP event server 12a, 12b terminates a previously generated SIP event subscription, and if so desired, deletes the subscription for the service invocation previously stored in memory 26 of the SIP event server. Further, the SIP event server can appropriately confirm receipt of the SUBSCRIBE message, and termination of the invoked service, with a message such as a '200 OK' message, sent to the invoking entity via proxies 18 and 20.

As will be appreciated, embodiments of the present invention are fully applicable to a wide range of services and content, as well as to other types of discoverable information. As an additional example, embodiments of the present invention may be applicable to invoke web services, such as in accordance with a delivery framework such as that provided by RPC's (Remote Procedure Calls), CORBA (Common Object Request Broker Architecture), SOAP (Simple Object Access Protocol) or the like. In this regard, as will be appreciated by those skilled in the art, the SOAP architecture provides a manner of encapsulating messages in envelopes, sometimes referred to as SOAP messages or SOAP envelopes, which can then be transferred from one network entity to another over a bearer protocol, such as HTTP (Hypertext Transfer Protocol). In this regard, information in the encapsulated messages can be formatted in any of a number of different manners, such as in accordance with Resource Description Framework (RDF) or XML (Extensible Markup Language). For more information on SOAP, see D. Box et al., *Simple Object Access Protocol V*1.1, W3C Note NOTE-soap-20000508, World Wide Web Consortium (2000), the contents of which are hereby incorporated by reference in its entirety.

With respect to a delivery framework such as SOAP, then, the invoking entity 14 can invoke a service at a number of event servers 12 by forming a SUBSCRIBE message, as before, including the identity or description of the Web service (e.g., service name), one or more parameters required to properly invoke the desired Web service, and/or one or more other pieces of information. Within the SUBSCRIBE message, however, the Web service description, parameter(s) and/or other piece(s) of information can be encapsulated in a SOAP envelope. Further, if so desired, the SOAP envelope can be encoded in an appropriate format such as, for example, as a UTF-8 (Unicode Transformation Format-8) media type "application/xml." In this manner, a service invocation event-based mechanism can be mapped on SOAP.

As before, in accordance with the multipoint service invocation method of embodiments of the present invention, the SUBSCRIBE message, including the SOAP envelope, is addressed to an AOR assigned to multiple event servers 12a, 12b having characteristic(s) represented by the AOR, those event servers being web service providers in this case. In this regard, the event servers 12a, 12b may be within the same group of event servers assigned a common address-of-record (AOR) URI representative of one or more characteristics of the event servers. For example, event servers providing a mapping service may be assigned an AOR reflective of that service. To further identify the mapping of the web service invocation on SOAP, however, a "soap" designation can be pre-pended to the AOR URI's, as well as the contact URI's, before the prepended "sip" designation (e.g., "soap.sip://mapserver.myexample.com/mapservice").

In response to the SUBSCRIBE message, the SIP proxy 18 maps the AOR in the SUBSCRIBE message to the contact addresses of one or more event servers 12a, 12b. Upon mapping the AOR in the SUBSCRIBE message to the contact addresses of one or more event servers, the local SIP proxy 18 can fork or otherwise forward the SUBSCRIBE message to each of the respective event servers, which can individually extract the service invocation information in the SOAP envelope, and invoke the desired service as before. After invoking the service, the SIP event server appropriately confirms receipt of the SUBSCRIBE message with message 68, such as a '200 OK' message, sent to the invoking entity via proxies 18 and 20. Alternatively, if the SIP event server fails to invoke the desired service, such as due to one or more incorrect parameters, lack of resources, lack of permission to invoke the service or the like, the SIP event server may send message to the invoking entity via proxies 18 and 20, where the message indicates failure to invoke the desired service. Further, each SIP event server 12a, 12b can send one or more NOTIFY messages back to the invoking entity 14 via proxies 18 and 20, such as in the same manner as explained above. However, to continue mapping the service invocation event-based mechanism on SOAP, the payloads of the return messages (e.g., 200 OK, NOTIFY, etc.) can also be encapsulated in accordance with SOAP, such as in the same manner as the SUBSCRIBE message.

According to one aspect of the present invention, all or a portion of the system of the present invention, such all or portions of the SIP event servers 12a, 12b, invoking entity 14 and/or SIP proxy 18, 20, generally operate under control of a computer program product. The computer program product for performing the methods of embodiments of the present invention includes a computer-readable storage medium, such as the non-volatile storage medium, and computer-readable program code portions, such as a series of computer instructions, embodied in the computer-readable storage medium.

In this regard, FIG. 4 is a control flow diagram of methods, systems and program products according to the invention. It will be understood that each block or step of the control flow diagram, and combinations of blocks in the control flow diagram, can be implemented by computer program instructions. These computer program instructions may be loaded onto a computer or other programmable apparatus to produce a machine, such that the instructions which execute on the computer or other programmable apparatus create means for implementing the functions specified in the control flow diagram block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the control flow diagram block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the control flow diagram block(s) or step(s).

Accordingly, blocks or steps of the control flow diagram support combinations of means for performing the specified functions, combinations of steps for performing the specified functions and program instruction means for performing the specified functions. It will also be understood that each block or step of the control flow diagram, and combinations of blocks or steps in the control flow diagram, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system comprising:
a plurality of event servers each of which includes a processor, the plurality of event servers being associated with a group address representative of at least one characteristic of the event servers, the event servers also being associated with at least one contact address; and
a proxy including a processor, the proxy being configured to receive a service invocation request addressed to the group address, wherein the request is for invocation of a service and includes a description of the service encapsulated in a Simple Object Access Protocol envelope, wherein the proxy is configured to map the group address to at least one contact address associated with the event servers, wherein the proxy is configured to forward the service invocation request to the event servers based upon the at least one contact address, and
wherein event servers are configured to receive the service invocation request and separately invoke the requested service.

2. A system according to claim 1, wherein the proxy is configured to receive the service invocation request from an invoking entity, and
wherein at least one of the event servers is further configured to send at least one notification to the invoking entity to thereby notify the invoking entity of a progress of the service invocation.

3. A system according to claim 1, wherein the event servers are configured to separately invoke the requested service in a substantially parallel manner.

4. A system according to claim 1, wherein the event servers are associated with a group address representative of at least one of a service provided by the event servers and a location of the event servers.

5. A system according to claim 1, wherein the event servers are associated with a group address representative of a web service provided by the event servers.

6. A method comprising:
receiving a service invocation request addressed to a group address associated with a plurality of event servers, wherein the group address is representative of at least one characteristic of the event servers, and wherein the request is for invocation of a service and includes a description of the service encapsulated in a Simple Object Access Protocol envelope;

mapping the group address to at least one contact address associated with the event servers; and forwarding the service invocation request to the event servers based upon the at least one contact address, the service invocation request being forwarded such that the event servers thereafter separately invoke the requested service.

7. A method according to claim 6, wherein receiving a service invocation request comprises receiving a service invocation request from an invoking entity, and wherein forwarding the service invocation request comprises forwarding the service invocation request such that at least one of the event servers further sends at least one notification to the invoking entity to thereby notify the invoking entity of a progress of the service invocation.

8. A method according to claim 6, wherein forwarding the service invocation request comprises forwarding the service invocation request such that the event servers thereafter separately invoke the requested service in a substantially parallel manner.

9. A method according to claim 6, wherein receiving a request comprises receiving a request addressed to a group address representative of at least one of a service provided by the event servers and a location of the event servers.

10. A method according to claim 6, wherein receiving a request comprises receiving a request addressed to a group address representative of a web service provided by the event servers.

11. A method according to claim 6, wherein receiving a request comprises receiving a service invocation request over a bearer protocol different from Simple Object Access Protocol.

12. A method comprising:
sending a service invocation request for invocation of a service, wherein the service invocation request is addressed to a group address associated with a plurality of event servers and includes a description of the service encapsulated in a Simple Object Access Protocol envelope, wherein the group address is representative of at least one characteristic of the event servers, wherein the event servers are also associated with at least one contact address, wherein sending the service invocation request comprises sending the service invocation request such that a proxy maps the group address to at least one contact address associated with the event servers, and forwards the service invocation request to the event servers based upon the at least one contact address, and such that the event servers thereafter separately invoke the requested service; and receiving at least one notification from at least one of the event servers to thereby notify the invoking entity of a progress of the service invocation.

13. A method according to claim 12, wherein sending the service invocation request comprises sending the service invocation request such that the event servers separately invoke the requested service in a substantially parallel manner.

14. A method according to claim 5, wherein sending the service invocation request comprises sending the service invocation request addressed to a group address representative of at least one of a service provided by the event servers and a location of the event servers.

15. A method according to claim 12, wherein sending the service invocation request comprises sending the service invocation request addressed to a group address representative of a web service provided by the event servers.

16. A method according to claim 12 further comprising:
encapsulating a description of the service in a Simple Object Access Protocol (SOAP) envelope before sending the service invocation request, wherein sending the service invocation request comprises sending the service invocation request including the SOAP envelope.

17. An apparatus comprising a processor and a memory storing executable instructions that in response to execution by the processor cause the apparatus or another apparatus to at least perform the following:
sending a service invocation request for invocation of a service, the service invocation request being addressed to a group address associated with a plurality of event servers and including a description of the service encapsulated in a Simple Object Access Protocol envelope, wherein the group address is representative of at least one characteristic of the event servers, wherein the event servers are also associated with at least one contact address, wherein sending the service invocation request comprises sending the service invocation request such that a proxy maps the group address to at least one contact address associated with the event servers, and forwards the service invocation request to the event servers based upon the at least one contact address, and such that the event servers thereafter separately invoke the requested service; and receiving at least one notification from at least one of the event servers to thereby notify the invoking entity of a progress of the service invocation.

18. An apparatus according to claim 17, wherein sending the service invocation request comprises sending the service invocation request such that at least one of the event servers further sends at least one notification to the apparatus to thereby notify the apparatus of the progress of the service invocation.

19. An apparatus according to claim 17, wherein sending the service invocation request comprises sending the service invocation request such that the event servers thereafter separately invoke the requested service in a substantially parallel manner.

20. An apparatus according to claim 17, wherein sending the service invocation request comprises sending the service invocation request addressed to a group address representative of at least one of a service provided by the event servers and a location of the event servers.

21. An apparatus according to claim 17, wherein sending the service invocation request comprises sending the service invocation request addressed to a group address representative of a web service provided event servers.

22. An apparatus according to claim 17, wherein the memory stores executable instructions that in response to execution by the processor cause the apparatus to further perform the following:
encapsulating a description of the service in a Simple Object Access Protocol (SOAP) envelope before sending the service invocation request, wherein sending the service invocation request comprises sending the service invocation request including the SOAP envelope.

* * * * *